(12) United States Patent
Hicks et al.

(10) Patent No.: US 9,579,577 B2
(45) Date of Patent: Feb. 28, 2017

(54) ELECTRONIC SYSTEM WITH CHALLENGE MECHANISM AND METHOD OF OPERATION THEREOF

(71) Applicant: Samsung Electronics Co., Ltd., Suwon-si, Gyeonggi-Do (KR)

(72) Inventors: James Roy Carl Hicks, Mountain View, CA (US); Esther Jun Kim, San Jose, CA (US); Suranjit Adhikari, San Jose, CA (US); Dion Isselhardt, Saratoga, CA (US); Stacie Lynn Hibino, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 244 days.

(21) Appl. No.: 14/310,362

(22) Filed: Jun. 20, 2014

(65) Prior Publication Data

US 2015/0367233 A1    Dec. 24, 2015

(51) Int. Cl.
*A63F 13/10*    (2006.01)
*A63F 13/87*    (2014.01)
*A63F 13/795*   (2014.01)

(52) U.S. Cl.
CPC ............ *A63F 13/87* (2014.09); *A63F 13/795* (2014.09)

(58) Field of Classification Search
USPC .......................................................... 463/31
See application file for complete search history.

(56) References Cited

U.S. PATENT DOCUMENTS

| | | | |
|---|---|---|---|
| 5,453,015 A | 9/1995 | Vogel | |
| 8,117,261 B2 | 2/2012 | Briere et al. | |
| 8,340,994 B2 | 12/2012 | Tota et al. | |
| 2006/0149990 A1* | 7/2006 | S. | .............. H04L 1/22 714/1 |
| 2008/0183829 A1 | 7/2008 | Smilowitz et al. | |
| 2014/0120511 A1* | 5/2014 | Hall | .......... G09B 5/02 434/350 |

OTHER PUBLICATIONS

Marilyn A. Walker, P. A. (2011). Classifying Stance in Online Political Debate. Natural Language and Dialogue Systems Lab, University of California Santa Cruz, 1-26.

* cited by examiner

*Primary Examiner* — Pierre E Elisca
(74) *Attorney, Agent, or Firm* — IP Investment Law Group

(57) ABSTRACT

An electronic system includes: a communication unit is configured to communicate a challenge; a user interface, coupled to the communication unit is configured to select rich content for a point of view based on the challenge; and a storage unit, coupled to the user interface, is configured to capture a response to the point of view based on the challenge.

20 Claims, 9 Drawing Sheets

ELECTRONIC SYSTEM WITH CHALLENGE MECHANISM AND METHOD OF OPERATION THEREOF

TECHNICAL FIELD

An embodiment of the present invention relates generally to an electronic system, and more particularly to a system for challenges.

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

These electronic devices can display information including statistics, pictures, cards, or purchases. The information is intended for a user of the device with a specific time or location, for social interaction or location based information. This social interaction or location based information is increasing popular.

Virtual interactions or exchanges are limited to text-centric or single media-centric solutions. Limitation including fixed amount of time per user, minimal if any use of contextual information, and indeterminate winner, plague current virtual interactions or exchanges such as head-to-head competition, trash talk, team-based chat room, head-to-head betting, or support for trash talk.

Thus, a need still remains for a three-dimensional electronic system with an improved system for challenges. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a communication unit is configured to communicate a challenge; a user interface, coupled to the communication unit is configured to select rich content for a point of view based on the challenge; and a storage unit, coupled to the user interface, is configured to capture a response to the point of view based on the challenge.

An embodiment of the present invention provides a method of operation of an electronic system including: communicating, with a communication unit, a challenge; selecting rich content for a point of view based on the challenge; and capturing a response to the point of view based on the challenge.

An embodiment of the present invention provides a non-transitory computer readable medium including stored thereon instructions to be executed by a control unit comprising, including: communicating a challenge; selecting rich content for a point of view based on the challenge; and capturing a response to the point of view based on the challenge.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
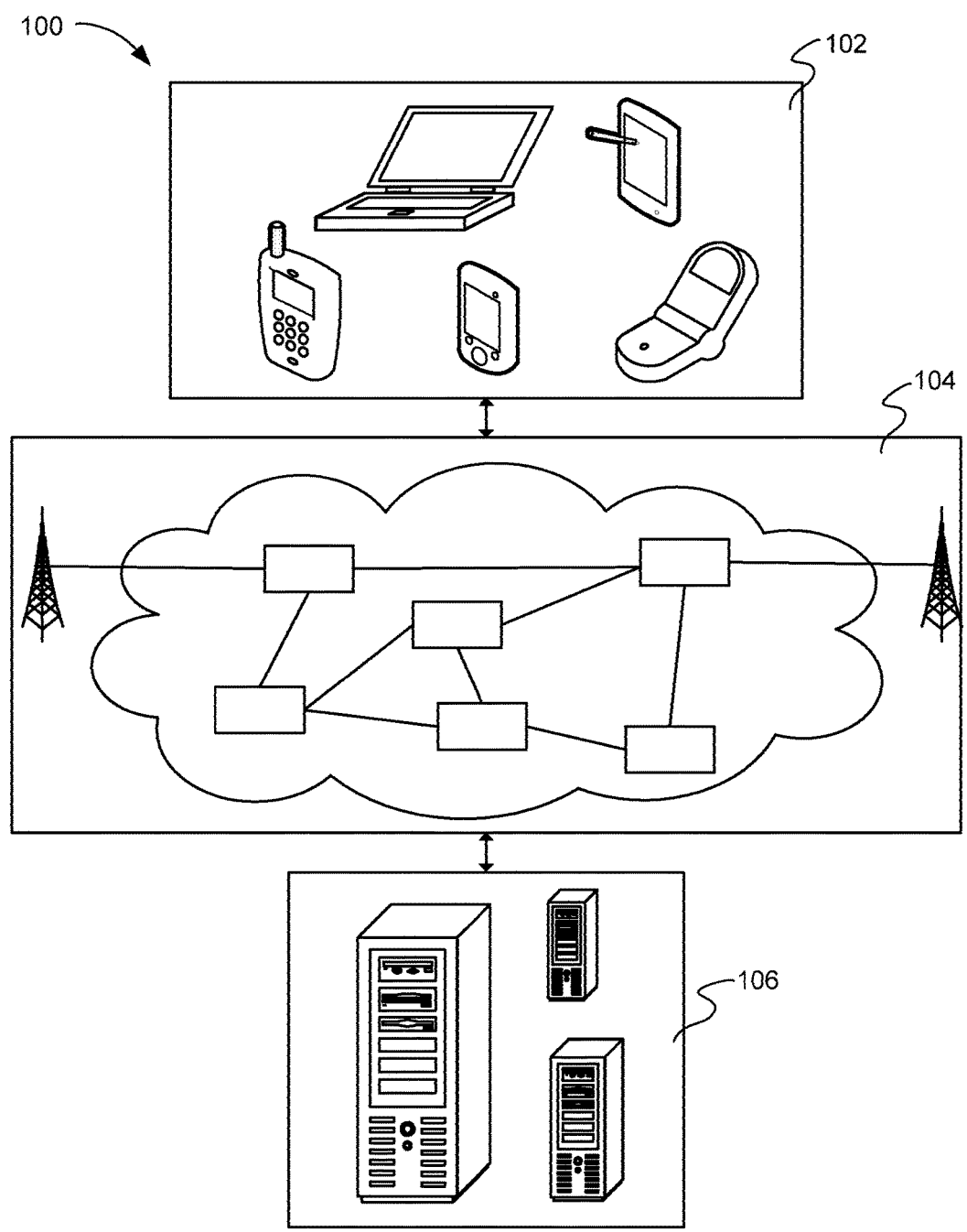
FIG. 1 is an electronic system with control mechanism in an embodiment of the present invention.

An embodiment of the present invention includes a novel system for a user(s) to exchange their point of view with another user(s) through a variety of digital media such as a game-like context. The system can provide an interactive gaming space that allows the user(s) to challenge other user(s) through a variety of content submissions such as video, statistics, virtual cards, text, images illustrations, or combination thereof, in a one round or multi-round "match."

Another embodiment of the present invention includes a description of a system and method that enables use of context such as an environment around user, related to an event, or combination thereof. The context can inform, manage user status, manage time available, structure debate content such as rich content submissions including video, dynamic statistic creation, virtual card, text, images, illustrations, or combination thereof, to determine a winner of a virtual challenge.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with control mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the electronic system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
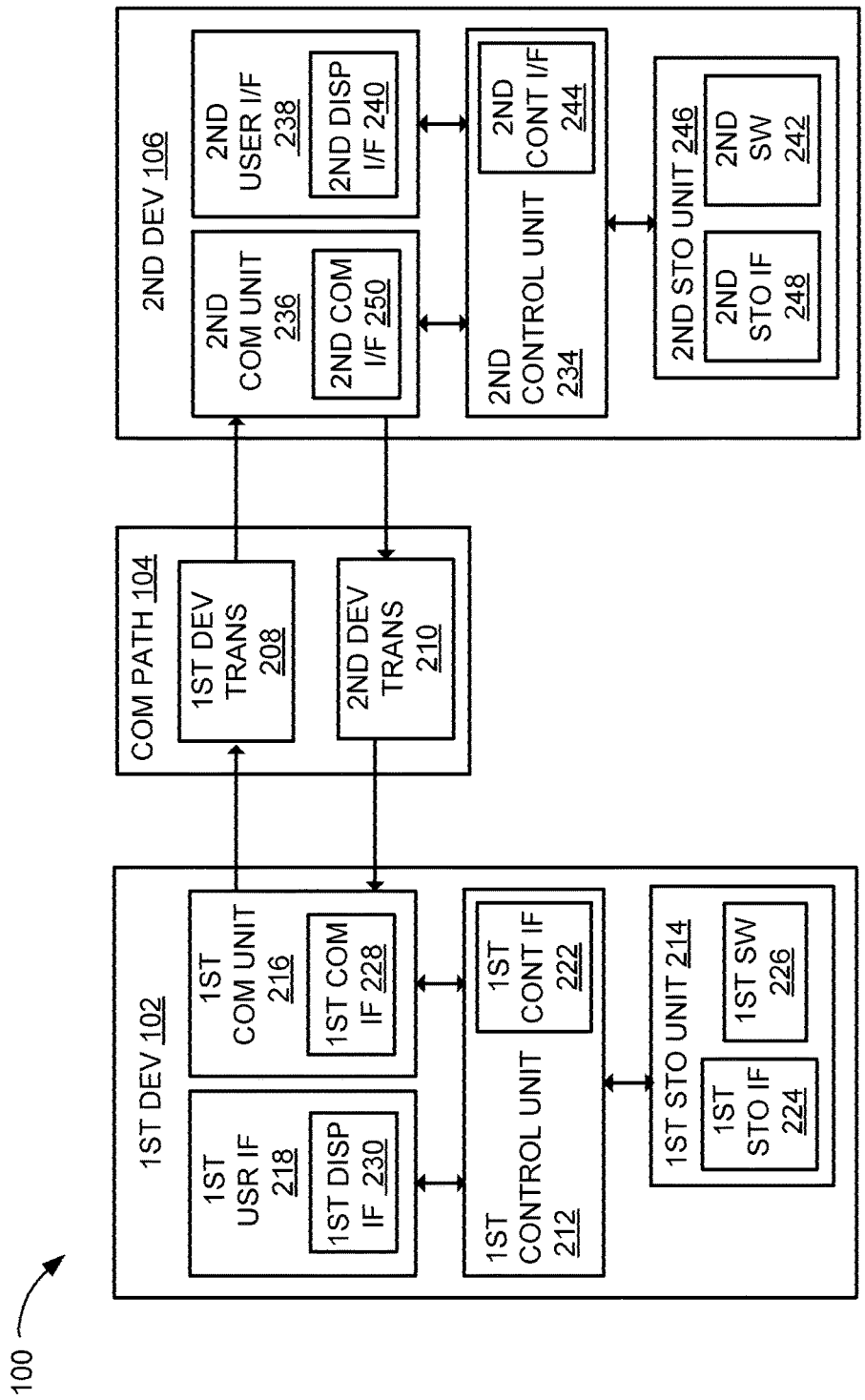
FIG. 2 is an exemplary block diagram of the electronic system.

Referring now to FIG. 2, therein is shown an exemplary block diagram of the electronic system 100. The electronic system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the electronic system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

The modules described in this application can be implemented as instructions stored on a non-transitory computer readable medium to be executed by a first control unit 212, the second control unit 234, or a combination thereof. The non-transitory computer medium can include the first storage unit 214, the second storage unit 246, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

Modules in this application can be hardware implementation, hardware circuitry, or hardware accelerators in the first control unit 212 or in the second control unit 234. The modules can also be hardware implementation, hardware circuitry, or hardware accelerators within the first device 102 or within the second device 106 but outside of the first control unit 212 or the second control unit 234, respectively.

Modules in this application can be at least a part of the first software 226, the second software 242, or a combination thereof. These modules can also be stored in the first storage unit 214, in the second storage unit 246, or a combination thereof. The first control unit 212, the second control unit 234, or a combination thereof can execute these modules for operating the electronic system 100.

The modules described in this application can be implemented as instructions stored on a non-transitory computer readable medium to be executed by a first control unit 212 of FIG. 2, the second control unit 234 of FIG. 2, or a combination thereof. The non-transitory computer medium can include the first storage unit 214 of FIG. 2, the second storage unit 246 of FIG. 2, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

Figure 3:
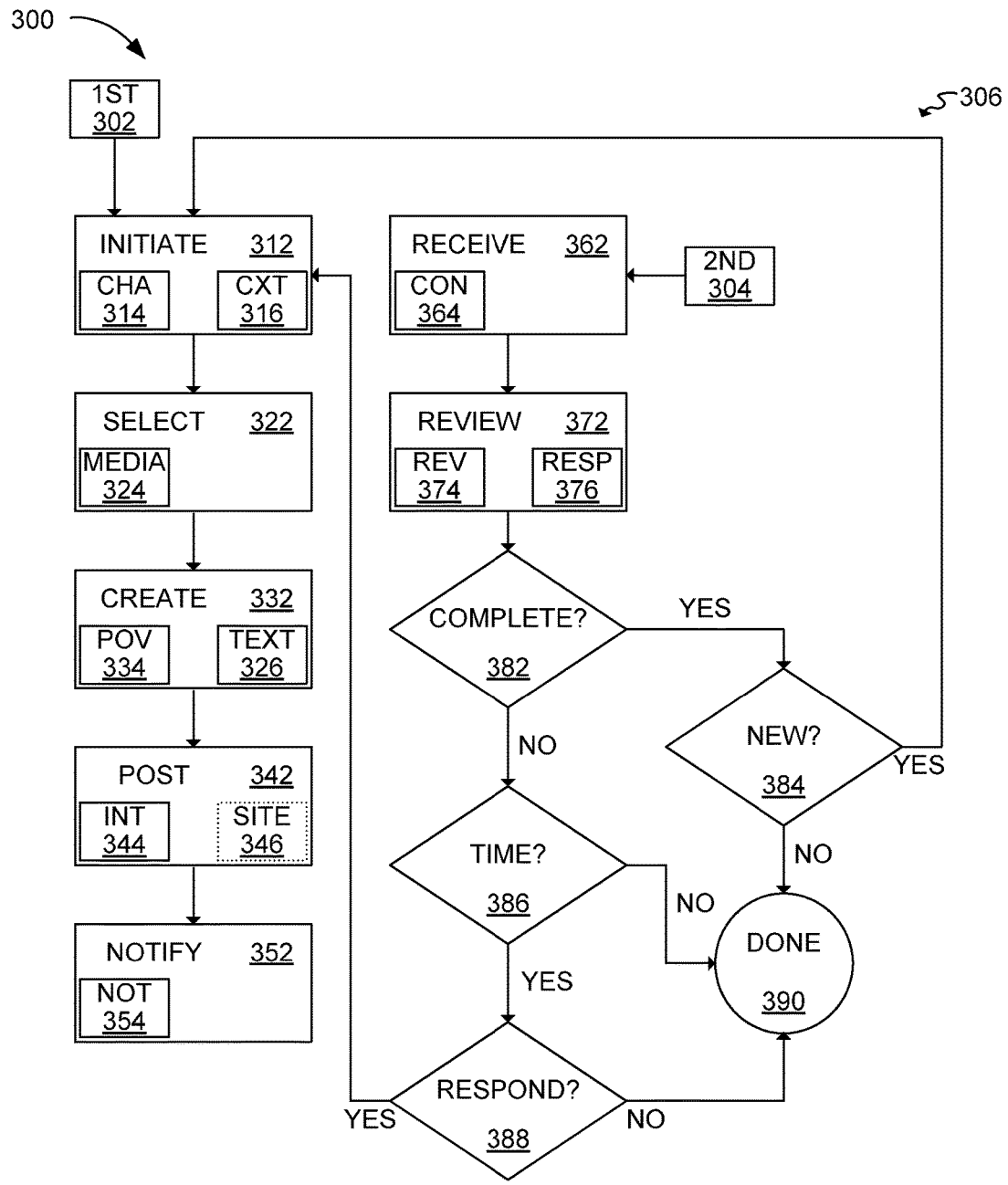
FIG. 3 is an exemplary control flow of the electronic system.

Referring now to FIG. 3, therein is shown an exemplary control flow 300 of the electronic system 100. The control flow 300 can include a one on one (1:1) throwdown wherein the term throwdown refers to a challenge or debate such as virtual challenges or virtual debates, between two or more individuals, groups, or combination thereof. The term throwdown can also refer to an overall challenge or debate supported by the electronic system 100 including a user challenging another user to a throwdown with one or more rounds. The control flow 300 can be implemented and accessed with the first device 102 of FIG. 1, the second device 106 of FIG. 1, or combination thereof.

For example the throwdown can be an electronically controlled virtual challenge with a first user 302 challenging a second user 304 regarding a topic, a point of view, a team, a participant, any content, or combination thereof. The first user 302 and the second user can engage in one or more challenge rounds 306 such as one of a cycle, a loop, an iteration, a back and forth, or a conversation.

The first user 302 or a group including the first user 302 can provide input to an initiate challenge process of an initiate challenge module 312 such as an initiate challenge or response module, to initiate or communicate a challenge 314 or respond to the second user 304 or a group including the second user 304. The challenge 314 can include a context 316 including context-based constraints and recommendations for posing challenges and constraining time to respond.

A selection of media for point of view process of a select module 322 can provide selection by the first user 302 of media 324 including media type for expressing the challenge 314 of the first user 302. The media 324 can be multiple types of media such as video, statistics, virtual cards, text, images, illustrations, media articles, current events, rich content, or combination thereof. For example, the media 324 can be digital medial selected in an interactive a game-like context such as an interactive space such as a gaming space.

A creation or formulation process of a create module 332 can provide creation of a point of view 334. The point of view 334 can include the media 324, text 326 such as supporting or appropriate key words, rich content, phrases, description, argument, highlighted text, cut and paste text, clip art text, or combination thereof. For example, the point of view 334 with the media 324, the text, 326, or combination thereof, can provide a rich experience for virtual challenges, debates, throwdowns, or combination thereof, based on multiple types of capture and selection of the media 324.

A post point of view process of a post module 342 can provide posting of the point of view 334 for the second user 304, the group including the second user 304, or combination thereof. The post module 342 can include an interface 344 to a common site 346 such as a server, a website, a blog, accessible locations, or combination thereof. Optionally the post module 342 can include the common site 346 or provide an interface 344 to the common site 346.

A notification of point of view process of the notify module 352 can provide a notification 354 for the second user 304 or the group including the second user 304 that the point of view 334 has been posted on the common site 346. The notify module 352 send, post, visually indicate visually, indicate aurally, other indicators, or combination thereof, that the notification 354 has been provided.

A receive challenge process, a response notification process, or combination thereof, of a receive module 362 can provide a confirmation 364 such as with notification, that the point of view 334 posted on the common site 346 has been be received by the second user 304. Thus the point of view 334 of the first user 302 is available to the second user 304.

A review posted point of view process of the review module 372 can include a second user review 374 of the point of view 334 posted by the first user 302. Optionally, the second user 304 can review the point of view 334 posted by the first user 302 and prepare, formulated, created, provide, or combination thereof, a response 376. The response can also include rich content such as the context 316, the media 324, the text 326, or combination thereof.

A round complete process of a complete decision module 382 can provide a decision or answer such as a "yes" or a "no" The second user 304 or the first user 302 can determine, decide, respond, answer, or combination thereof, whether the challenge round 306 is complete or not complete.

A start new round process of a new decision module 384 can provide a decision or answer such as a "yes" or a "no". The second user 304 or the first user 302 can determine, decide, respond, answer, or combination thereof, whether to start a new or another of the challenge rounds 306 based on a "yes" response or answer of the complete decision module 382.

A time still available process of a time decision module 386 can provide a decision or answer such as a "yes" or a "no". The second user 304 or the first user 302 can determine, decide, respond, answer, or combination thereof, whether time is available to continue the challenge rounds 306 based on a "no answer of the complete decision module 382.

A want to respond process of the respond decision module 388 can provide a decision or answer such as a "yes" or a "no". The second user 304 or the first user 302 can determine, decide, respond, answer, or combination thereof, whether to provide the response 376 of the second user 304, another of the response 376 of the first user 302, another of the response of the second user 304, or combination thereof, to continue the challenge round 306 base on a "yes" answer of the time decision module 386.

A challenge done process of a done module 390 can stop, end, terminate, finish, or combination thereof, the challenge rounds 306. The challenge rounds 306 can be done based on a "no" response or answer of the start new round process of the new decision module 384. The challenge rounds 306 can also be done based on a "no" response or answer of the time still available process of the time decision module 386. The challenge rounds 306 can also be done based on a "no" response or answer of the challenge done process of the done module 390.

For illustrative purposes, a one on one (1:1) throwdown is described although it is understood that any format, any number of users, any number of groups, and any number in a group can participate in a throwdown. There is no limit to the formats or combinations of participants in a throwdown.

It has been discovered that the electronic system 100 with the point of view 334 including the media 324 can provide a rich experience for conducting virtual challenges and debates through the use of multiple types of media capture and selection.

It has also been discovered that the electronic system 100 provides ability to access the electronic system 100 through multiple devices, including mobile solutions such as mobile phones, tablets, phablets, portable computing devices, or combination thereof, such as the first device 102, the second device 106, or combination thereof.

It has further been discovered that the electronic system 100 with the selection of media for point of view process of the select module 322 provides the ability to choose from the media 324 such as uploaded or self-recorded video, charts of data, other digital materials, recordings, or combination thereof, to support a user the point of view 334 of the first user 302, the second user 304, or combination thereof, for a much richer experience than is currently available today.

Figure 4:
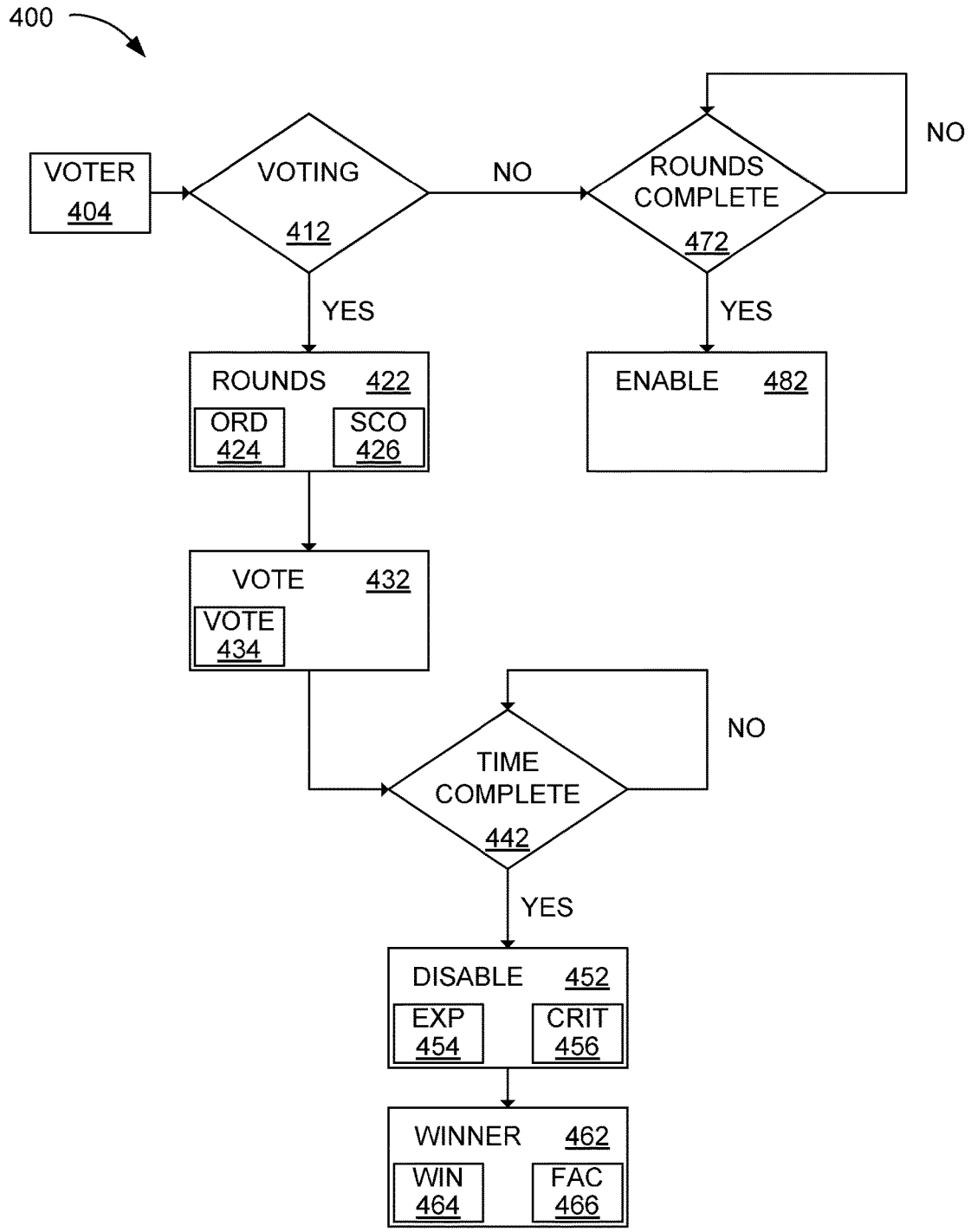
FIG. 4 is an exemplary control flow of a voting process phase of the electronic system.

Referring now to FIG. 4, therein is shown an exemplary control flow of a voting process phase 400 of the electronic system 100. The voting process phase 400 can provide voting for determining a winner of a throwdown, challenge, or debate. Participants in the voting, such as a voter 404, can include a user or users of a group discussion that did not initiate the challenge 314 of FIG. 3, such as the first user of FIG. 3, did not provide the response 376 of FIG. 3, such as the second user 304 of FIG. 3. The voting process phase 400 can receive input such as results of the challenge rounds 306 of FIG. 3 from the challenge done process of the done module 390 of FIG. 3

A voting enabled process of a voting decision module 412 can provide a decision or answer such as a "yes" or a "no". The voting decision module 412 can determine, decide, respond, answer, or combination thereof, whether the voting process phase 400 of the electronic system 100 is to enabled, operating, turned on, activated, or combination thereof.

A review all throwdown rounds process of a review rounds module 422 can score, tally, weigh, weight, rank, consider, compare, or combination thereof, the challenge rounds 306 of FIG. 3. The review rounds module 422 can determine or decide an order 424 or a score 426 of the users such as the first user 302 or the second user 304.

A cast vote process of a vote module 432 can provide votes 434 for one or more users such as the first user 302 or the second user 304, one or more of the challenge rounds 306, or combination thereof. For example, the voters 404 can each cast one of the votes 434 for one user in each of the challenge rounds 306 based on the order 424 of the users, the score 426 of the users, or combination thereof.

A voting time complete process of a time complete decision module 442 can provide a decision or answer such as a "yes" or a "no". The time complete decision module 442 can determine, decide, respond, answer, or combination thereof, whether the voting process phase 400 is complete.

A disable voting process of a disable module 452 can disable, stop, end, terminate, finish, or combination thereof, the voting by the voters 404 based on a "yes" response or answer of the time complete decision module 442. The disable module 452 can disable voting based on an expiration of time 454, or other temporal criteria 456 such as relative time, absolute time, or combination thereof.

An indicate winner process of a winner module 462 can determine, decide, respond, answer, or combination thereof, a winner 464 based on the votes 434. The winner module 462 can score, tally, count, weigh, weight, rank, consider, process, compare, or combination thereof, the votes 434 to determine the winner 464. For example, the winner 464 can be determined by the highest number of the votes 434. As another example, a weighting factor applied to the votes 434 to determine the winner 464.

A throwdown rounds complete process of a rounds complete decision module 472 can provide a decision or answer such as a "yes" or a "no". The rounds complete decision module 472 can end, terminate, or finish the voting process phase 400. The voting process phase 400 can be complete based on a "no" response or answer of the voting enablement process of the voting decision module 412. The rounds complete decision module 472 can also end, terminate, or finish the voting process phase 400 based on a predetermined or specific number of "no" responses of rounds complete decision module 472.

A voting enablement process of an enable process module 482 can enable, operate, turn on, activate, or combination thereof, the voting process phase 400. The enable process module 482 can determine, decide, respond, answer, or combination thereof, whether to enable the voting process phase 400 based on a "yes" response or answer of the rounds complete decision module 472.

Figure 5:
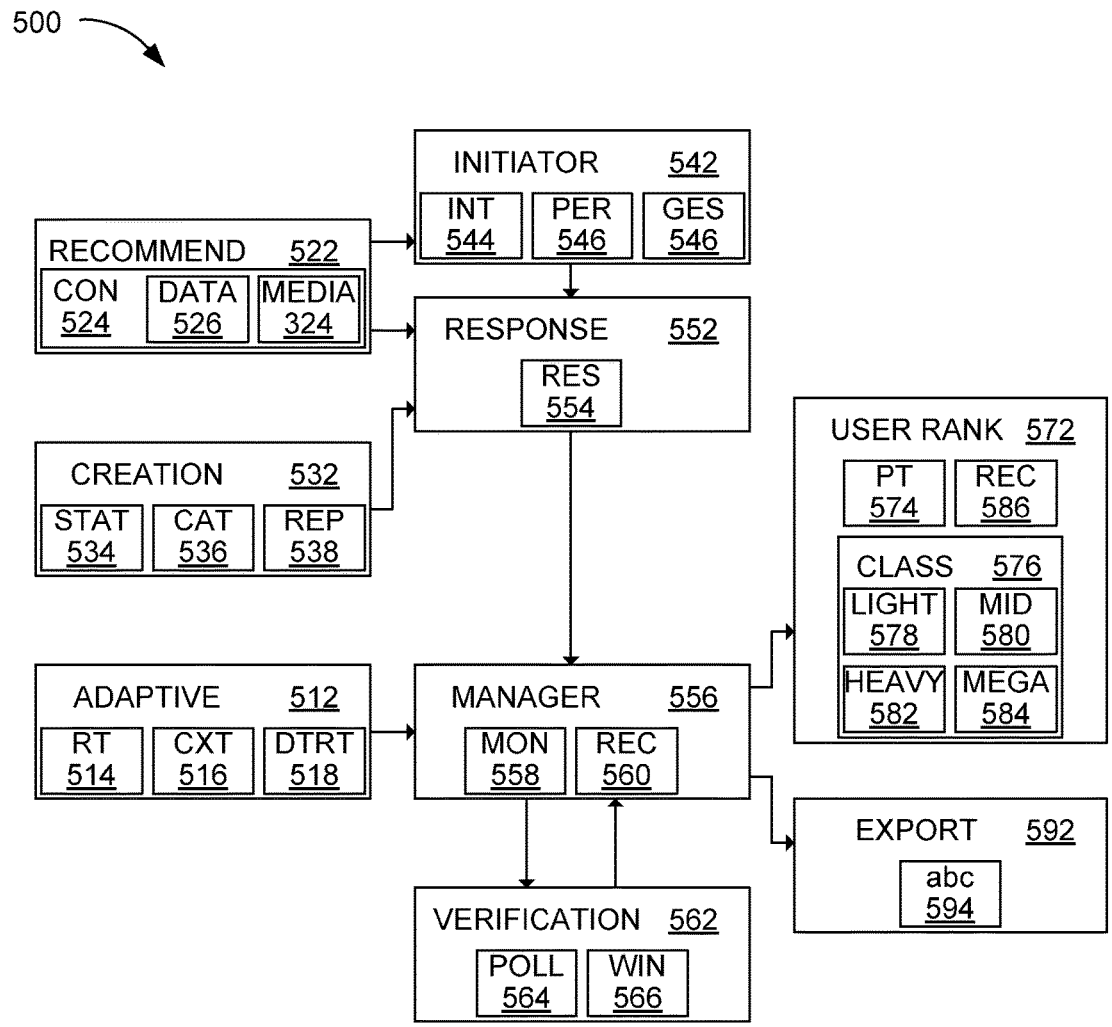
FIG. 5 is an exemplary control flow of the electronic system.

Referring now to FIG. 5, therein is shown an exemplary control flow 500 of the electronic system 100. The control flow 500 can be based on a group of users watching a live sports game such as on television in their respective homes. All are participating in a group chat room from their smart phones, through which they can virtually socialize, talk about the game, "smack talk" about players or teams they dislike, or combination thereof. If a user writes a controversial post to the group chat room, another of the users can initiate or communicate a "throwdown" such as a challenge or debate against that user based on the chat posting.

For illustrative purposes, the control flow 500 uses sports events as context for throwdown although it is understood that the control flow 500 is not limited to the sports domain and may be applied to any domains such as politics, science, entertainment, reality shows, or combination thereof. Further for illustrative purposes, smart phones are described for conducting a throwdown although it is understood that the control flow 500 may include any other device including such as tablet devices, laptop computers, smart televisions, or combination thereof.

The control flow 500 can include group throwdowns such as group challenges or group debates, including many-to-many throwdowns, group-to-group throwdowns, as well as the one to one (1:1) throwdowns described above. For example, the group throwdowns can include features described throughout the descriptions with the addition of providing for multiple users including multiple users from each of multiple groups participating in any given of the challenge rounds 306 of a throwdown. Optionally, one user within each of the groups can participate per round allowing other users within each of the groups to simultaneously engage in additional throwdowns, allowing other users to engage in subsequent rounds, or combination thereof.

An adaptive response process of an adaptive module 512 can provide a dynamic adaptive context based response timer for a throwdown, debate, or the challenge 314 of FIG. 3, that can regulate a response time 514 based on contextual information 516. The contextual information 516 can be related to an event and a specific comment of the throwdown. The adaptive module 512 can determine a response time to best fit a position of a throwdown as well as to provide sufficient voting or polling time.

The adaptive module 512 can also provide a pre-determined throwdown time period. Based on a particular situation, the pre-determined throwdown time period such as a time limitation can adaptively change to provide time for generation of a relevant response, conclusion of the voting process, or combination thereof.

The adaptive module 512 can include a dynamic throwdown response timer 518. The dynamic throwdown response timer 518 can predict a time remaining in an event, a time for a group to reach a threshold of votes necessary to determine a winner, and adjust a response timer, a round timer, or combination thereof, based on the predictions. The dynamic throwdown response timer 518 can also monitor activity of an expected responding user such as the second user 304 of FIG. 3, for determining whether the expected responding user loses a throwdown by forfeiting a right to respond or whether the throwdown should be canceled because the expected responding use is unavailable.

For example, the adaptive module 512 can predict a time remaining in a broadcast and adjust a response time for creating content and providing time for voting for a throwdown initiated or communicated near an end of a football game such as two minutes remaining. Further for example, given the throwdown is related to an outcome of the football game, the adaptive module 512 can avoid having a user such as the second user 304 of FIG. 3, waiting until the game ends to respond thus providing an unfair advantage, prohibiting extensive voting since many users such as the voters 434 of FIG. 4 would exit upon completion of the game, or combination thereof.

A content recommendation process of a recommend module 522 can recommend content including media types of the media 324, detailed data 526, substance of content, rich content selection, or combination thereof, to be used for a throwdown. The content 524 such as rich content 524 can include any content types for creating the point of view 334 of FIG. 3 or the challenge 314 of FIG. 3, and can search and prepare the content 524 based on choice of content type from the first user 302 that can best support the point of view 334 of the first user 302. The rich content can include the context 316 of FIG. 3, the media 324 of FIG. 3, the text 326 of FIG. 3, the detailed data 526, statistics data, the statistics representation, or combination thereof.

The recommend module 522 can also update, modify, filter, or combination thereof, the challenge 314 such as a video throwdown, for creating the content 524 as unique, customized, or combination thereof. For example, the recommend module 522 can apply a filter to create a sepia-toned video, added team related virtual stickers, custom images, unique images, or combination thereof.

For example, the first user 302 can select a video such as a highlight video from ESPN Sports Center to support the challenge 314 such as a throwdown position since the first user 302 of FIG. 3 decided not to create a personal video. The recommend module 522 can recommend the content 524 based on the contextual information 516 related to the challenge 314, other categories such as history, channel relevance for most effective presentation, relationship information between challengers such as the second user 304, or combination thereof.

For another example, the first user 302 initiates the challenge 314 such as a throwdown, with "Texas A&M is no match for BAMA on Saturday." The recommend module 522 can recommend a highlight video of Texas A&M's victory over BAMA from a previous season, a video section of Sports Center discussing why Texas A&M has a great chance of winning, recent statistics showing predictions or polls related to Saturday's game, or combination thereof.

The electronic system 100 can start the challenge rounds 306 of FIG. 3 based on monitoring comments and behaviors of the second user 304 tagged by the first user 302. The recommend module 522 can recommend the content 524 created by the electronic system 100. The recommend module 522 can further anticipate an event and prepare the challenge 314 such as throwdown, as well as save or store the content 524 of the challenge 314 for reusing the content 524, the challenge 314, or combination thereof, in the initiate challenge process of initiate challenge module 312 of FIG. 3, or another of the challenge rounds 306.

A dynamic statistics creation process of a creation module 532 can generate statistical data 534 such as unique statistical representations of data for the content 524 of the challenge 314 such as a throwdown. The first user 302 can select from many categories 536 such as sport level including pro, college, high school, other levels, or combination thereof; team including coach, general manager (GM), player, past season, ranking, offense, other team related items, or combination thereof; attribute including season, touchdowns, yards gained, salary, public records, other attributes, or combination thereof; or combination thereof. The categories 536 can expand a scope of the statistical data 534 based on a selection of one or more of the categories 536.

The statistical data 534 is not limited by the categories 536 and can be real-time statistic data such as dynamic statistics. For example, the first user is not limited to displaying the statistical data 534 for Texas A&M, BAMA, or combination thereof. The statistical data 534 can include a win percentage of Texas A&M against teams to which BAMA lost, any other of statistical data 534, or combination thereof.

The statistical data 534 can be presented or displayed based on preferences of the first user 302, the second user 304, or combination thereof. For example, comparing a percentage of wins for Texas A&M and BAMA over 20 years can be displayed with a statistical representation 538 of a pie chart. If additional of the statistical data 534, such as Texas A&M wins over teams that beat BAMA, were added the pie chart would be ineffective. Thus, a selection of the statistical representations 538 for the statistical data 534 can be provided by the creation module 532 for selecting a preferred representation based on the statistical data 534 for display.

A one-click (1-Click) initiator process of an initiator module 542 activates a throwdown interface 544 on a user device such the first device 102 of FIG. 1, the second device 106 of FIG. 1, or combination thereof. The throwdown interface 544 can provide for creating, selecting, receiving, or combination thereof, a recommendation of the content 524 such as the statistical data 534 including real time statistic data, based on the recommend module 522 and the creation module 532.

The initiator module 542 can launch the challenge 314 with personalized content 546 from a posting to a group discussion with the one-click initiator process. A gesture 548 such as a hover over, a swipe in a predefined direction, a tap, or combination thereof, by the first user 302 can indicate a decision to initiate the challenge 314 such as a throwdown. The gesture 548 can indicate or be recognized as the one-click initiator process for the challenge 314 to a specific post of an event group wall such as a group discussion connected to a live sports game. The first display interface 230 of FIG. 2 for the first user 302, can display the personalized content 546, the content 524, or combination thereof.

For example, the first user interface 218 of the first device 102 can activate a camera feature with a video feed presented on the first device 102 based on the first user 302 creating a video submission. The personalized content 546 such as a video, can be captured by the first device 102 based on a time specific to the challenge 314, or the challenge rounds 306. The video can be displayed on the first display interface 230 when the first user 302 stops recording the video or the time has elapsed or expired, allowing approval of the video or creation of a replacement video.

Further to the example, based on approval of the personalized content 546, the challenge 314 with the personalized content 546 such as the video, can be posted for a designated user such as the second user 304, group of users such as a group of the second users 304, multiple users such as multiple of the second user 304, or combination thereof. Accepting the challenge 314 by any of the second user 304 can activate the one-click initiator process for detecting the content 524 and creating the point of view 334 of the second user 304.

A challenge and response process of a response module 552 can provide for creating, combining, selecting, receiving, or combination thereof, a challenge response 554 to the challenge 314 including the content 524, the detailed data 526, the statistical data 534 including real time statistic data, the statistical representations 538, the personalized content 546, the context 316 of FIG. 3, the media 324 of FIG. 3, the text 326 of FIG. 3, or combination thereof. The challenge and response process of the response module 552 can also utilize the one-click initiator process of the initiator module 542.

A throwdown manager process of a manager module 556 can provide the adaptive response process of the adaptive module 512, the challenge and response process of the response module 552, or combination thereof, interaction with win verification, user ranking, exporting, sharing, other processes, other modules, or combination thereof. The manager module 556 can monitor, manage, track, reconcile, annotate, compare, associate, or combination thereof, the interaction.

The throwdown manager process of the manager module 556 can monitor, manage, track, or combination thereof, the challenge response 554 with the response time 514 with a monitor module 558. The throwdown manager process of the manager module 556 can also reconcile, annotate, compare, associate, or combination thereof, user ranking with win verification, the challenge response 554, or combination thereof, with a reconcile module 560. The monitor module 558, the reconcile module 560, or combination thereof can monitor, manage, track, reconcile, annotate, compare, associate, or combination thereof, the challenge response 554, the contextual information 516, the challenge response 554, or combination thereof with exporting, sharing, or combination thereof.

A win verification process of a verification module 562 determines a winner of the challenge 314 based on voting, facts, recent outcomes, other criteria for evaluating the point of view 334, automated approaches for evaluating the point of view 334, or combination thereof. The verification module 562 can verify a poll 564 to determine a winner 566 based on accuracy of submission, selection between popular vote and poll, accuracy for the content 524 of the challenge 314 to actual results, or combination thereof.

The winner 566 can also be determined based on an actual outcome or result in the statistical data 534 instead of popularity of the challengers such as the first user 302, the second user 304, or combination thereof. In this or similar cases, the win verification process of the verification module 562 can accurately or objectively declare the winner 566 of the challenge rounds 306. The win verification process of a verification module 562 and the throwdown manager process of the manager module 556 can also include at least a portion of the voting process phase 400.

A user ranking process of a user rank module 572 can create points 574, a user class 576, a user weight 576, a user weight class 576, or combination thereof. The points 574, the user class 576, or combination thereof, can reward winners and provide a competitive environment for all throwdowns.

The user class 576 can include a lightweight class 578 that can include new users, users who do not participate in throwdowns, users who have a low throwdown to win ratio; a middleweight class 580 that can include users who are above a threshold of throwdowns, users who are above a win ratio; a heavyweight class 582 that can include top users who participate and win, a megaweight class 584 such as users in a top tier; a percentage class or bracket such as five percent (5%) of a group, five percent (5%) of total users, ten percent (10%) of a group, ten percent (10%) of total users, one hundred percent (100%) of a group, one hundred percent (100%) of total users, or combination thereof.

The points 574, the user class 576, or combination thereof can incentivize participation and penalize bad or poor behavior. The user ranking process of a user rank module 572 can penalize the first user 302, the second user 3042, or combination thereof, by demoting the first user 302, the second user 304 to a lower level of the user class 576.

The user ranking process of the user rank module 572 can incentivize participation such as allowing the user such as the first user 302, the second user 304, or combination thereof, in the megaweight class 584 to opt out of any of the challenges 314 or block other users such as the first user 302, the second user 304, or combination thereof.

Preventing a user in a lower of the user class 576 who loses to a user in a higher of the user class 576, from challenging users in the higher of the user class 576 until the user in the lower of the user class 576 wins a predetermined number of additional of the challenges 314 can also incentivize participation.

The user ranking process of a user rank module 572 can also incentivize participation by allocating a same amount of time for submission of the point of view 334 based on user of the same of the user class 576 in the challenge round 306. Based on user in different of the user class 576 in the challenge round 306, proportionally less time can be allocated for a user in a higher of the user class 576 than a user in a lower of the user class 576. For example, when a user in the megaweight class 584 is challenged by a user in the heavyweight class 582, slightly less time is allowed for the user in the megaweight class 584 for submission, but if challenged by a user in the lightweight class 578, there is significantly less time for the user in the megaweight class 584 to respond.

Optionally, the points 574 can reward users with recognition 586 such as virtual trophies. The points 574 can also be exchanged other forms of the recognition 586 such as discounts, merchandise, tickets, other forms of recognition, or combination thereof. For example, the points 574 can also "buy time" as the recognition 586, such as saying "hi", a quick virtual chat, a personal message, or combination thereof, with a specific athlete recognizing their fan status or achievement.

An export and share process of an export module 592 can capture, share, save, post, distribute, transfer, send, provide, or combination thereof, the challenges 314, the point of views 334, the challenge rounds 306, the votes, the winner, all portions of the throwdown, or combination thereof. The export and share process of the export module 592 can save all of the challenge rounds 306 for a throwdown as a throwdown file 594 such as a single file, for storage or sharing such as via social networking systems including Facebook®, Twitter®, YouTube®, other social networking systems, or combination thereof. The throwdown file 594 can include the contextual information 516, the context 316 of FIG. 3, the content 524, the votes, the winner, for export or sharing to enable playback and sharing of throwdowns outside of the electronic system 100.

It has been discovered that the electronic system 100 can include group throwdowns with all the modules described herein. Multiple users including multiple users from each of the groups can participate in any of the challenge rounds 306.

It has also been discovered that the user ranking process of a user rank module 572 can also incentivize participation and penalize bad or poor behavior. The first user 302, the second user 304, or combination thereof, in the megaweight class 584 can opt out of the challenges 314 or block other users. The first user 302, the second user 304, or combination thereof, can be demoted to a lower level of the user class 576.

Figure 6:
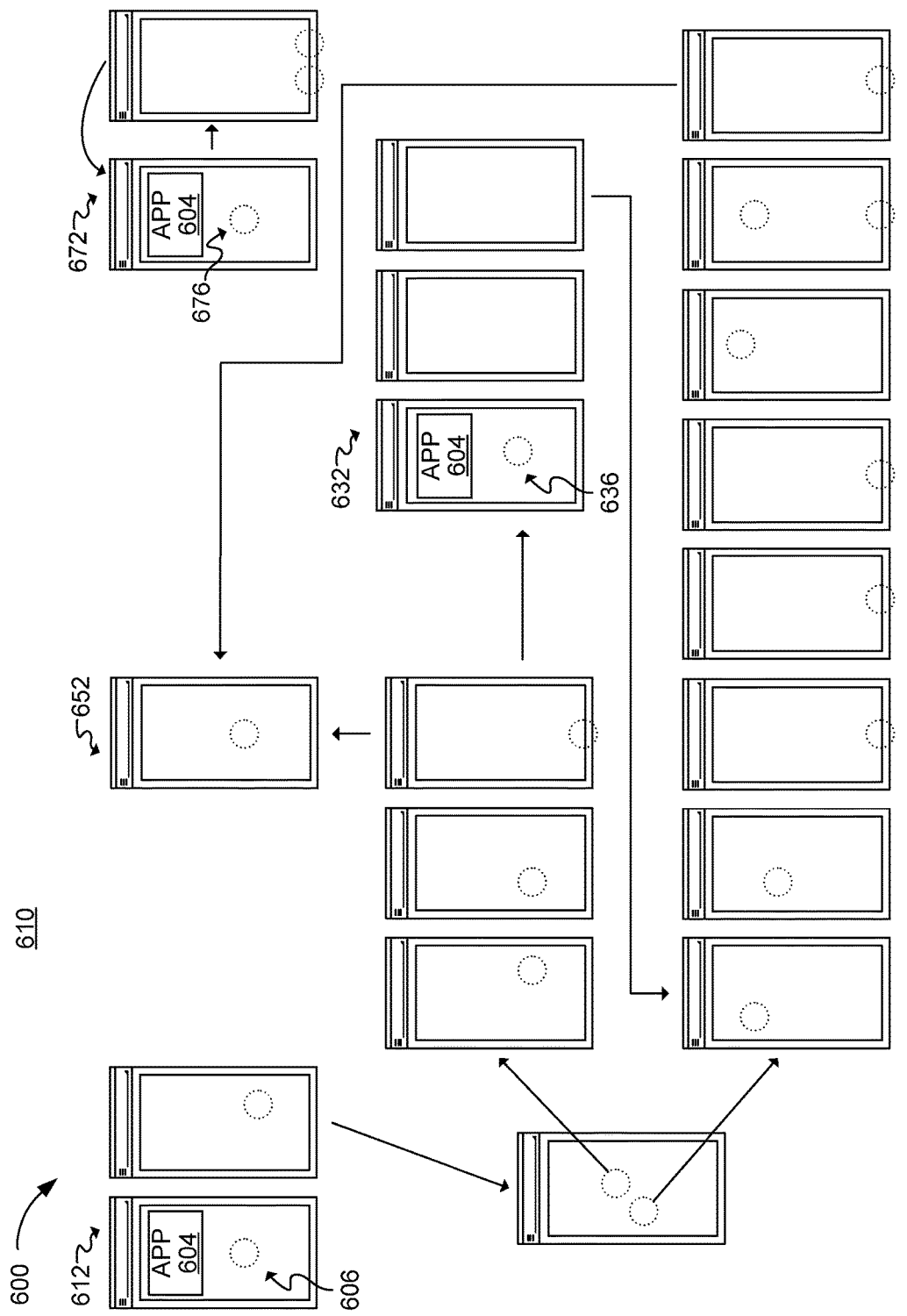
FIG. 6 is a plan view with displays of the electronic system in an exemplary embodiment.

Referring now to FIG. 6, therein is shown a plan view 600 with displays of the electronic system 100 in an exemplary embodiment. In a manner similar to the control flow 300 of FIG. 3, the control flow 500 of FIG. 5, or combination thereof, the plan view 600 can include a crowd throwdown enabling many-to-many challenges, group-to-group challenges, or combination thereof.

The crowd throwdown can include a context of an overall public fan base beyond a private circle of friends. The crowd throwdown can be initiated by a user such as a fan, a group of users such as a group of fans, a group of users that rally together without the need for previous contact between the users, a team, a league, a sponsor, an advertiser, or combination thereof.

For example, a crowd throwdown with "fan challenges" can be initiated by users that are not official entities such as teams, leagues, sponsors, advertisers, officials, employees, or combination thereof. The crowd throwdown with "fan challenges" initiated by a user without official entities can be moderated, reviewed, authorized, cleared for airing, or combination thereof, by crowd based voting such as fans expressing interest in one challenge over another challenge, taking a profile of the initiating user, taking credentials of the initiating user, taking a recommendation of the initiating user, official moderation review, or combination thereof.

Further to the example, wins, points, number of interest votes, or combination thereof, can provide rewards such as an announcement in a stadium such as on a 'jumbotron', listing on a winner board, "team time", a personal message from a team related to the throwdown, an athlete related to the throwdown, or combination thereof. The rewards can be provided for the initiating user, other participants, voters, the group of fans, the group of users, or combination thereof.

The plan view 600 can include a challenge application 604 of the first software 226 of FIG. 2, the second software 242 of FIG. 2, or combination thereof, such as the control flow 300 of FIG. 3, the control flow 500 of FIG. 5, a sports-based mobile application for implementing the challenge rounds 306 of FIG. 3, or combination thereof.

A first user such as the first user 302 of FIG. 3 such as a group of the first users 302, or combination thereof, can challenge a second user such as the second user 304 of FIG. 3 such as a group of the second users 304, or combination thereof, with the challenge application. The first user can hover, swipe, tap, or combination thereof, for selecting first portions 606 of the first user displays 612, for creating the point of view 334 of FIG. 3 of the challenge 314. The first user can initiate the challenge 314 of FIG. 3 through first user displays 612 with the content 524 of FIG. 5 selected from the first portions 606 of the first user displays 612.

The first user displays 612 can be implemented with the first display interface 230 of FIG. 2 of the first device 102 of FIG. 1, the second display interface 240 of FIG. 2 of the second device 106 of FIG. 2, or combination thereof. The first user displays 612 can include rich content such as images, displays, screen compositions, graphical user interfaces, graphical application interfaces, or combination thereof, from any number of the first user displays 612. The rich content can include the context 316 of FIG. 3, the media 324 of FIG. 3, the text 326 of FIG. 3, the detailed data 526 of FIG. 5, the statistical data 534 of FIG. 5, the statistical representations 538 of FIG. 5, or combination thereof.

The challenge 314 can be posted and the second user can be notified. The second user can respond to the challenge 314 through second user displays 632. The second user can hover, swipe, tap, or combination thereof, second portions 636 of the second user displays 632, for creating the point of view 334 of the second user. For example, the second user can provide the response 376 of FIG. 3 including a statistics based chart such as the statistical data 534 of FIG. 5, with the challenge application 604 with the content 524 selected from the second portions 632 of the second user displays 632.

The second user displays 632 can be implemented with the first display interface 230 of the first device 102, the second display interface 240 of the second device 106, or combination thereof. The second user displays 632 can include rich content such as images, displays, screen compositions, graphical user interfaces, graphical application interfaces, or combination thereof, from any number of the first user displays 612. The rich content can include the context 316, the media 324, the text 326, the detailed data 526, the statistical data 534, the statistical representations 538, or combination thereof.

A graphical representation of a throwdown including the challenge rounds 306 can be displayed on a throwdown display 652. The throwdown display 652 can be displayed on the first user display, 612, the second user display 632, voters displays, or combination thereof, for determining, deciding, responding, answering, or combination thereof, the winner 464 based on the votes 434. The throwdown display 652 can include the challenge 314 with the context 316, the media 324, the point of view 334, the text 326, the detailed data 526, the statistical data 534, the statistical representations 538, or combination thereof, and the challenge response 554 created, combined, selected, received, captured, stored, or combination thereof, with the content 524, the statistical data 534 including real time statistic data, the personalized content 546, or combination thereof.

Voters such as the voter 404 of FIG. 4 can vote for the winner 464 of FIG. 4 through voter displays 672. The voters can hover, swipe, tap, or combination thereof, for selecting voter portions 676 of the voter displays 672, for voting for or scoring the challenge rounds 306. For example, the voters can score, tally, weigh, weight, rank, consider, compare, or combination thereof, the challenge rounds 306 selected from the voter portions 676 of the voter displays 672. The voter displays 672 can be implemented with the first display interface 230 of the first device 102, the second display interface 240 of the second device 106, or combination thereof.

It has been discovered that the electronic system 100 can provide the crowd throwdown enabling many-to-many challenges, group-to-group challenges, or combination thereof. The crowd throwdown can include modules of the control flow 300, the control flow 500, or combination thereof, applied to the context of an overall public fan base beyond a private circle of friends.

Figure 7:
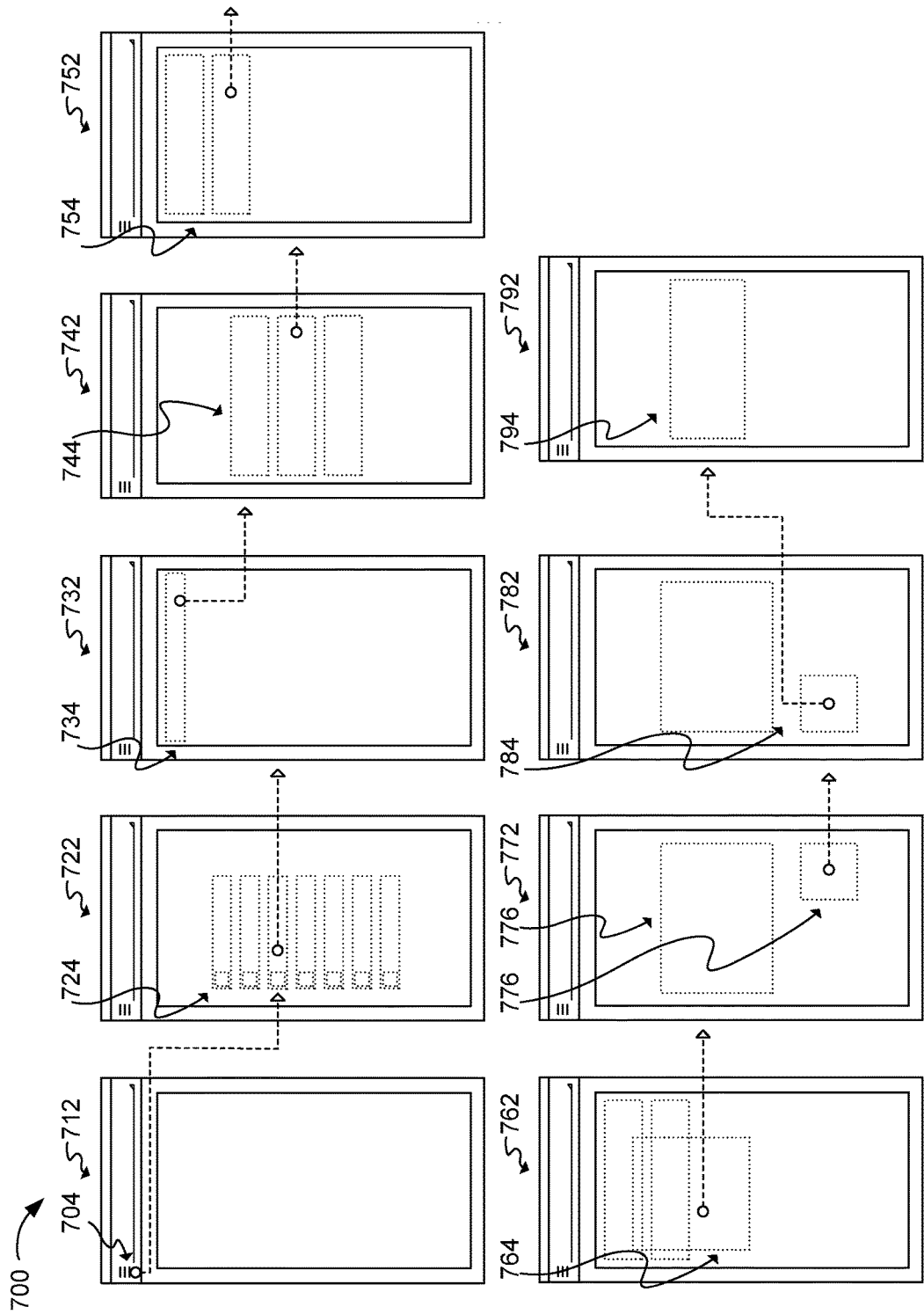
FIG. 7 is a plan view with displays of the electronic system in an exemplary embodiment.

Referring now to FIG. 7, therein is shown a plan view 700 with displays of the electronic system 100 in an exemplary embodiment. For example, the plan view 700 can include joining a group and initiating a throwdown with a self-video, a self-capture video, a video self-capture.

A user such as the first user 302 of FIG. 3, the second user 304 of FIG. 3, or combination thereof, can select such as tap, swipe, hover, or combination thereof, an application image 704 such as a link to a Samsung Sports Experience (SSE) application, of a game display 712 such as a display of baseball game information. Selecting the application image 704 of the game display 712 can open, activate, display, scroll, refresh, or combination thereof, an application display 722.

The application display 722 such as a left panel of the SSE application, can display icons 724 such as for functions or features of the application display 722 of the SSE application. The user can select such as tap, swipe, hover, or combination thereof, the icons 724 of the application display 722 to open, activate, display, scroll, refresh, or combination thereof, a first function display 732.

The first function display 732 such as a friends function, can display a menu 734 such as a grouping selection menu for the functions or features. The user can select such as tap, swipe, hover, or combination thereof, a portion of the menu 734 such as a group selection. The selection of the portion of the menu 734 can open, activate, display, scroll, refresh, or combination thereof, a second function display 742.

The second function display 742 such as groups of friends, can display selections 744 such as specific groups of friends. The user can select such as tap, swipe, hover, or combination thereof, one of the selections 744. The selection of the selections 744 can open, activate, display, scroll, refresh, or combination thereof, a room display 752.

The room display 752 such as a chat room, an SSE application room, or combination thereof, can include entries 754 such as chat, conversation, discussion, dialog, or combination thereof. The user can select such as tap, swipe, hover, or combination thereof, one of the entries 754. Selecting one of the entries 754 can open, activate, display, scroll, refresh, or combination thereof, a dialog display 762.

The dialog display 762 such as a chat room, an SSE application room, or combination thereof, can include options 764 for the entries 754. The user can select such as tap, swipe, hover, or combination thereof, one of the entries 754 for displaying the options 764 such as record a video, share statistics, upload a photo, options for dialog entries, or combination thereof. Selecting one of the options 764 can open, activate, display, scroll, refresh, or combination thereof, a media display 772.

The media display 772 such as a video recording function, an image capture function, an audio recording function, or combination thereof, can provide a media interface for including multi-media content 774 with the entries 754. The user can select such as tap, swipe, hover, or combination thereof, an initiate icon 776 such as a start icon, a shutter icon, a record icon, or combination thereof. Selecting the initiate icon 776 can open, activate, display, scroll, refresh, or combination thereof, a capture display 782.

The capture display 782 such as a video image, a still image, an audio indicator, or combination thereof, can provide capture of the multi-media content 774 such as recording a video, capturing an image, recording audio, or combination thereof. The user can select such as tap, swipe, hover, or combination thereof, a complete icon 784. Selecting the complete icon 784 such as a stop icon, a post icon, or combination thereof, can open, activate, display, scroll, refresh, or combination thereof, an update display 792.

The update display 792 such as a wall display, can display the entries 754 and the multi-media content 774 with a multi-media entry 794. The multi-media entry 794 can be posted in the update display 792 or wall display for other users of the room display 752.

It has been discovered that the electronic system 100 with the multi-media entry 794 can include initiating a throwdown, challenge, or debate, with the multi-media content 774. The challenge 314 of FIG. 3 can include the multimedia content 774 for the initiate challenge process of the initiate challenge module 312 of FIG. 3. Similarly, the point of view 334 of FIG. 3 can include the multi-media content 774 for the post point of view process of the post module 342 of FIG. 3.

Figure 8:
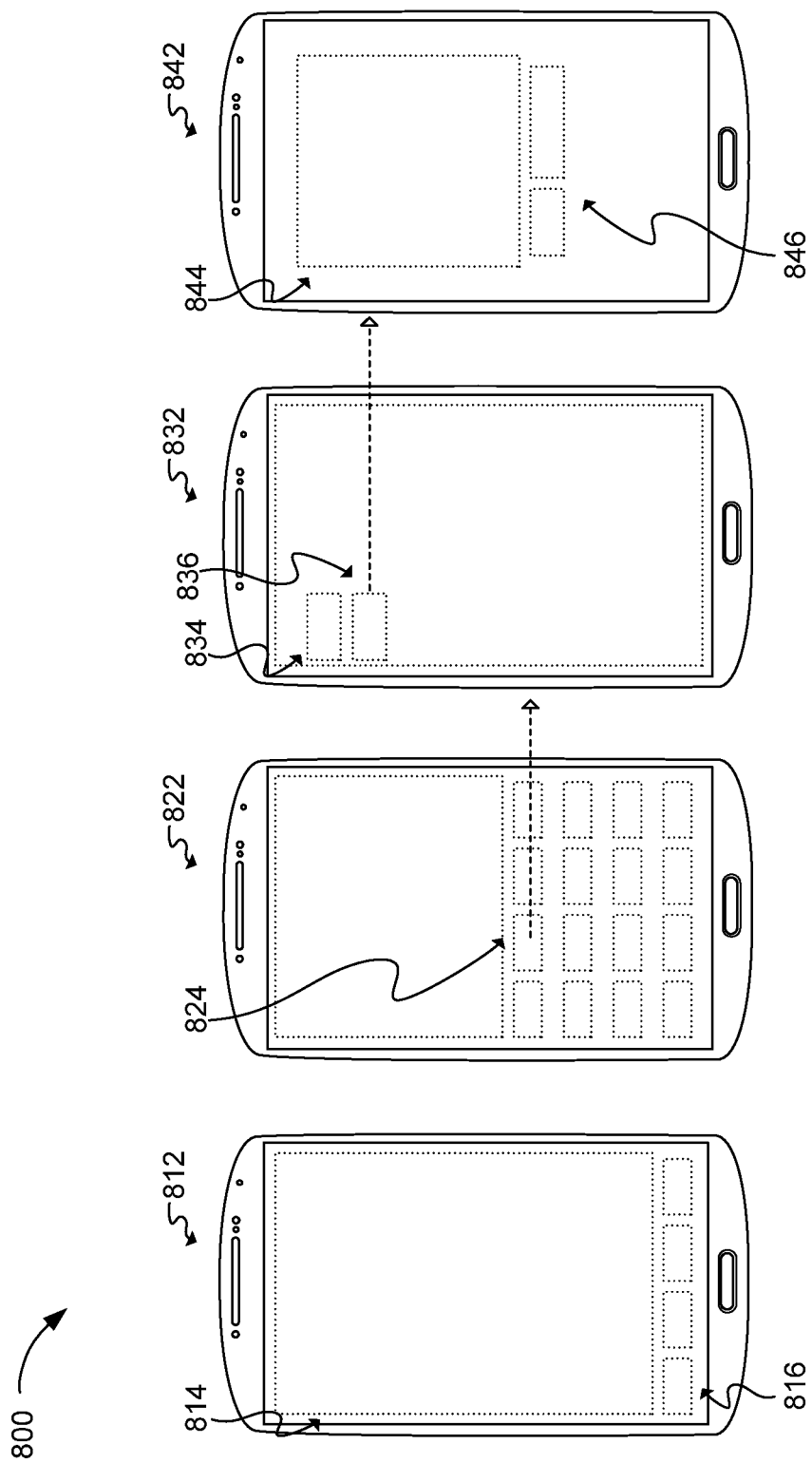
FIG. 8 is a plan view with displays of the electronic system in an exemplary embodiment.

Referring now to FIG. 8, therein is shown a plan view 800 with displays of the electronic system 100 in an exemplary embodiment. The plan view 800 can include sample displays for a throwdown with a public group of users. The sample displays described below can be implemented with the first device 102 of FIG. 1, the second device 106 of FIG. 1, the first user interface 218 of FIG. 2, the second user interface 234 of FIG. 2, or combination thereof.

An initial display 812 can include a topic 814 such as an opinion article, a news article, a document, or combination thereof. Responses 816 such as links to opinions, comments, throwdowns, or combination thereof, can be based on the topic 814. The initial display 812 can be scrolled to view additional sections of the topic 814 or additional of the responses 816 as depicted in a scroll display 822.

The scroll display 822 can provide viewing of the topic 814, the responses 816, or combination thereof, that are larger than the display size of the first device 102, the second device 106, the first user interface 218, the second user interface 234, or combination thereof. The scroll display 822 can include new responses 824 such as an add response link for adding responses such as opinions, comments, throwdowns, or combination thereof, based on the topic 814. Selecting such as tapping, swiping, hovering, or combination thereof, the responses 816, the new responses 824, or combination thereof, can open, activate, display, scroll, refresh, or combination thereof, an add response display 832.

The add response display 832 can provide an identifier input 834, a media input 836, or combination thereof. The identifier input 834 such as a name field, can label, identify, tag, name, or combination thereof, the new responses 824. The media input 836 such as a record icon, can open, activate, display, capture, or combination thereof, the media input 836 and can link the media input 836 to the response 816, the new responses 824, or combination thereof.

A view response display 842 can provide a media display 844 such as an image display, a video playback, a text display, or combination thereof. The view response display 842 can also include voting icons 846 such as an agree icon, a disagree icon, or combination thereof. The view response display 842 can be included in the vote module 432 and can provide input to the verification module 562 of FIG. 5.

Figure 9:
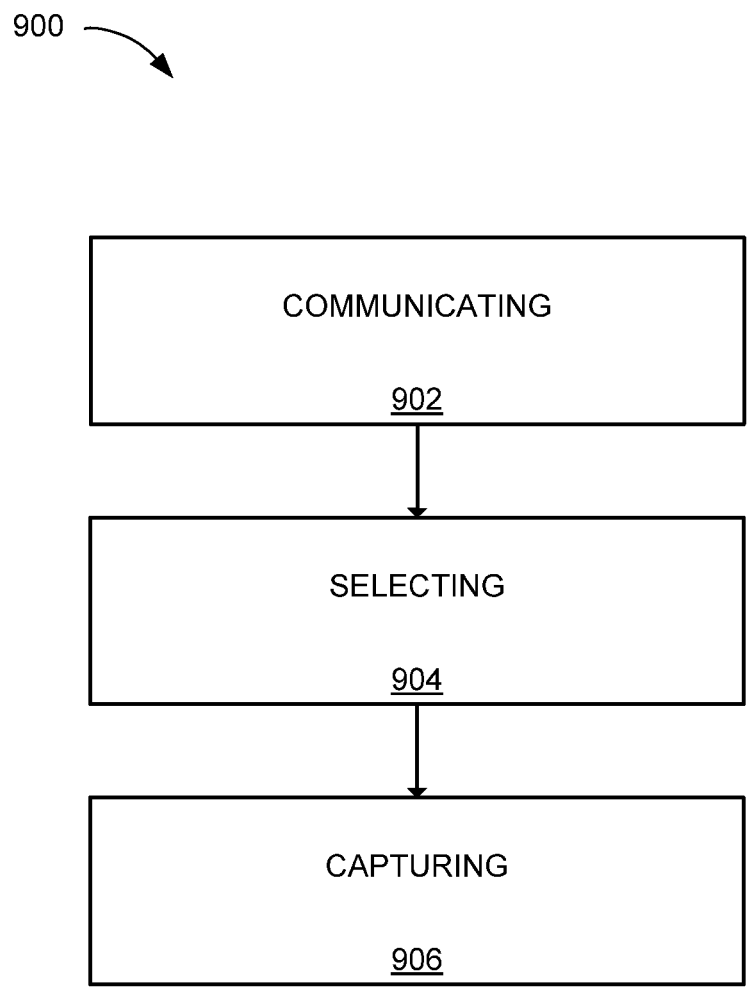
FIG. 9 is a flow chart of a method of operation of an electronic system in an embodiment of the present invention.

Referring now to FIG. 9, therein is shown a flow chart of a method 900 of operation of an electronic system 100 in an embodiment of the present invention. The method 900 includes: communicating, with a communication unit, a challenge in a block 902; selecting rich content for a point of view based on the challenge in a block 904; and capturing a response to the point of view based on the challenge in a block 906.

The initiate module 312 of FIG. 3 can be coupled to the select module 322 of FIG. 3, the create module 332 of FIG. 3, the post module 342 of FIG. 3, the notify module 352 of FIG. 3, the receive module 362 of FIG. 3, the review module 372 of FIG. 3, the complete decision module 382 of FIG. 3, the new decision module 384 of FIG. 3, the time decision module 386 of FIG. 3, the respond decision module 388 of FIG. 3, the done module 390 of FIG. 3, the voting decision module 412 of FIG. 4, the review rounds module 422 of FIG. 4, the vote module 432 of FIG. 4, the time complete decision module 442 of FIG. 4, the disable module 452 of FIG. 4, the winner module 462 of FIG. 4, the rounds complete decision module 472 of FIG. 4, the enable process module 482 of FIG. 4, the adaptive module 512 of FIG. 4, the recommend module 522 of FIG. 5, the creation module 532 of FIG. 5, the initiator module 542 of FIG. 5, the response module 552 of FIG. 5, the manager module 556 of FIG. 5, the verification module 562 of FIG. 5, the user rank module 572 of FIG. 5, the export module 592 of FIG. 5, or combination thereof.

The initiate module 312 can be implemented with the first user interface 218 of FIG. 2, the second user interface 238 of FIG. 2, the first communication unit 216 of FIG. 2, the second communication unit 236 of FIG. 2, the first storage unit 214 of FIG. 2, the second storage unit 246 of FIG. 2, the first control unit 212 of FIG. 2, the second control unit 234 of FIG. 2, or combination thereof.

The select module 322 can be coupled to the initiate module 312, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The select module 322 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The create module 332 can be coupled to the select module 322, the initiate module 312, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The create module 332 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The post module 342 can be coupled to the initiate module 312, the select module 322, the create module 332, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The post module 342 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The notify module 352 can be coupled to the initiate module 312, the select module 322, the create module 332, the post module 342, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The notify module 352 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The receive module 362 can be coupled to the initiate module 312, the select module 322, the create module 332, the post module 342, the notify module 352, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The receive module 362 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The review module 372 can be coupled to the initiate module 312, the select module 322, the create module 332, the post module 342, the notify module 352, the receive module 362, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The review module 372 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The complete decision module 382 can be coupled to the initiate module 312, the select module 322, the create module 332, the post module 342, the notify module 352, the receive module 362, the review module 372, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The complete decision module 382 can be implemented the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The new decision module 384 can be coupled to the initiate module 312, the select module 322, the create module 332, the post module 342, the notify module 352, the receive module 362, the review module 372, the complete decision module 382, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The new decision module 384 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The time decision module 386 can be coupled to the initiate module 312, the select module 322, the create module 332, the post module 342, the notify module 352, the receive module 362, the review module 372, the complete decision module 382, the new decision module 384, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The time decision module 386 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The respond decision module 388 can be coupled to the initiate module 312, the select module 322, the create module 332, the post module 342, the notify module 352, the receive module 362, the review module 372, the complete decision module 382, the new decision module 384, the time decision module 386, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The respond decision module 388 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The done module 390 can be coupled to the initiate module 312, the select module 322, the create module 332, the post module 342, the notify module 352, the receive module 362, the review module 372, the complete decision module 382, the new decision module 384, the time decision module 386, the respond decision module 388, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The done module 390 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The voting decision module 412 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The voting decision module 412 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The review rounds module 422 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The review rounds module 422 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The vote module 432 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The vote module 432 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The time complete decision module 442 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The time complete decision module 442 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The disable module 452 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the winner module 462, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The disable module 452 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The winner module 462 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the rounds complete decision module 472, the enable process module 482, the adaptive module 512, the recommend module 522, the creation module 532, the initiator module 542, the response module 552, the manager module 556, the verification module 562, the user rank module 572, the export module 592, or combination thereof.

The winner module 462 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The rounds complete decision module 472 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the enable process module 482, the adaptive module 512, the recommend module 522, the creation module 532, the initiator module 542, the response module 552, the manager module 556, the verification module 562, the user rank module 572, the export module 592, or combination thereof.

The rounds complete decision module 472 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The enable process module 482 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the adaptive module 512, the recommend module 522, the creation module 532, the initiator module 542, the response module 552, the manager module 556, the verification module 562, the user rank module 572, the export module 592, or combination thereof.

The enable process module 482 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The adaptive module 512 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the recommend module 522, the creation module 532, the initiator module 542, the response module 552, the manager module 556, the verification module 562, the user rank module 572, the export module 592, or combination thereof.

The adaptive module 512 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The recommend module 522 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the creation module 532, the initiator module 542, the response module 552, the manager module 556, the verification module 562, the user rank module 572, the export module 592, or combination thereof.

The recommend module 522 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The creation module 532 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the initiator module 542, the response module 552, the manager module 556, the verification module 562, the user rank module 572, the export module 592, or combination thereof.

The creation module 532 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The initiator module 542 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the response module 552, the manager module 556, the verification module 562, the user rank module 572, the export module 592, or combination thereof.

The initiator module 542 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The response module 552 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the manager module 556, the verification module 562, the user rank module 572, the export module 592, or combination thereof.

The response module 552 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The manager module 556 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the verification module 562, the user rank module 572, the export module 592, or combination thereof.

The manager module 556 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The verification module 562 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the user rank module 572, the export module 592, or combination thereof.

The verification module 562 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The user rank module 572 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the export module 592, or combination thereof.

The user rank module 572 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

The export module 592 can be coupled to the initiate module 312, the select module 322, the create module 332, the post module 342, the notify module 352, the receive module 362, the review module 372, the complete decision module 382, the new decision module 384, the time decision module 386, the respond decision module 388, the done module 390, the voting decision module 412, the review rounds module 422, the vote module 432, the time complete decision module 442, the disable module 452, the winner module 462, the rounds complete decision module 472, the enable process module 482, the adaptive module 512, the recommend module 522, the creation module 532, the initiator module 542, the response module 552, the manager module 556, the verification module 562, the user rank module 572, or combination thereof.

The export module 592 can be implemented with the first user interface 218, the second user interface 238, the first communication unit 216, the second communication unit 236 of FIG. 2, the first storage unit 214, the second storage unit 246, the first control unit 212 of FIG. 2, the second control unit 234, or combination thereof.

All of the modules herein can be implemented as hardware, hardware circuitry, or hardware accelerators with the first control unit 212 or with the second control unit 234. The modules can also be implemented as hardware, hardware circuitry, or hardware accelerators with the first device 102 or with the second device 106, and outside of the first control unit 212 or the second control unit 234, respectively.

All or at least a portion of the modules herein can be included in the first software 226, the second software 242, or a combination thereof. All or at least a portion of the modules herein can also be included in the first storage unit 214, the second storage unit 246, or a combination thereof. The first control unit 212, the second control unit 234, or a combination thereof can execute all of the modules included in the first software 226, the second software 242, the first storage unit 214, the second storage unit 246, or a combination thereof, for operating the electronic system 100.

All or at least a portion of the modules herein can be implemented through the first user interface 218, the second user interface, 238, the first communication unit 216, the second communication unit 236, or combination thereof. The first control unit 212, the second control unit 234, or a combination thereof can execute all of the modules implemented with the first user interface 218, the second user interface, 238, the first communication unit 216, the second communication unit 236, or combination thereof, for operating the electronic system 100.

Thus, all of the modules herein can be implemented with first control unit 212, the second control unit 234, the first communication unit 216, the second communication unit 236, the first user interface 218, the second user interface, the first storage unit 214, the second storage unit 246, or a combination thereof, for operating the electronic system 100.

The electronic system 100 has been described with module functions or order as an example. The electronic system 100 can partition the modules differently or order the modules differently. For example, control flow 300 of FIG. 3 can include the receive module 362 and the review module 372 as separate modules although these modules can be combined into one. Also, the adaptive module 512 can be split into separate modules for implementing in the separate modules the response time 514, the contextual information 516, and the dynamic throwdown response timer 518. Similarly the manager module 556 can be split into separate modules for each of the modules for the monitor module 558 the reconcile module 560.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a communication unit is configured to communicate a challenge;
   a user interface, coupled to the communication unit, is configured to select rich content for a point of view based on the challenge; and
   a storage unit, coupled to the user interface, is configured to capture a response to the point of view based on the challenge and a dynamic timer relative to communication of the challenge, wherein:
      the response includes personalized content and satisfies the dynamic timer, and
      the dynamic timer is calculated based on a classification associated with a user for the response, for the challenge, or a combination thereof.

2. The system as claimed in claim 1 wherein the communication unit is configured to post the point of view.

3. The system as claimed in claim 1 wherein the communication unit is configured to provide a notification that the point of view has been posted.

4. The system as claimed in claim 1 wherein the user interface is configured to select the rich content for the response.

5. The system as claimed in claim 1 wherein the user interface is configured to receive votes for the response or the point of view.

6. The system as claimed in claim 1 further comprising a control unit configured to determine a winner.

7. The system as claimed in claim 1 further comprising a control unit configured to process votes.

8. A method of operation of an electronic system comprising:
   communicating, with a communication unit, a challenge;
   selecting rich content for a point of view based on the challenge; and
   capturing a response to the point of view based on the challenge and a dynamic timer relative to communication of the challenge, wherein:
      the response includes personalized content and satisfies the dynamic timer, and
      the dynamic timer is calculated based on a classification associated with a user for the response or the challenge, or a combination thereof.

9. The method as claimed in claim 8 further comprising posting the point of view.

10. The method as claimed in claim 8 further comprising providing a notification that the point of view has been posted.

11. The method as claimed in claim 8 wherein capturing a response includes selecting the rich content for the response.

12. The method as claimed in claim 8 further comprising receiving votes for the response or the point of view.

13. The method as claimed in claim 8 further comprising determining a winner.

14. The method as claimed in claim 8 further comprising processing votes.

15. A non-transitory computer readable medium including stored thereon instructions to be executed by a control unit comprising:
   communicating a challenge;
   selecting rich content for a point of view based on the challenge; and capturing a response to the point of view based on the challenge and a dynamic timer relative to communication of the challenge, wherein:
  the response includes personalized content and satisfies the dynamic timer, and
  the dynamic timer is calculated based on a classification associated with a user for the response or the challenge, or a combination thereof.

16. The medium as claimed in claim 15 further comprising posting the point of view.

17. The medium as claimed in claim 15 further comprising providing a notification that the point of view has been posted.

18. The medium as claimed in claim 15 wherein capturing a response includes selecting the rich content for the response.

19. The medium as claimed in claim 15 further comprising receiving votes for the response or the point of view.

20. The medium as claimed in claim 15 further comprising determining a winner.

\* \* \* \* \*